United States Patent
Pagani et al.

(10) Patent No.: US 6,299,849 B1
(45) Date of Patent: *Oct. 9, 2001

(54) METHOD FOR IN-SITU MODERNIZATION OF A HETEROGENEOUS EXOTHERMIC SYNTHESIS REACTOR

(75) Inventors: Giorgio Pagani, Lugano; Ermanno Filippi, Castagnola, both of (CH)

(73) Assignee: Ammonia Casale S.A., Lugano-Besso (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,240

(22) Filed: Mar. 19, 1998

(30) Foreign Application Priority Data

Nov. 25, 1997 (EP) .................................................. 97203724

(51) Int. Cl.[7] ............................... C01C 1/04; C07C 27/06
(52) U.S. Cl. ........................... 423/361; 422/148; 422/191; 422/192; 422/198; 423/360; 423/659; 518/707
(58) Field of Search ..................................... 423/360, 361; 423/659; 422/148; 518/707

(56) References Cited

U.S. PATENT DOCUMENTS

| | | |
|---|---|---|
| 2,475,855 | 7/1949 | Peters . |
| 2,646,391 | 7/1953 | Boundry . |
| 3,010,807 | 11/1961 | Christensen et al. . |
| 4,250,057 * | 2/1981 | Foster et al. .......................... 423/363 |
| 4,271,136 | 6/1981 | Tennison . |
| 4,518,574 | 5/1985 | Osman et al. . |
| 4,568,532 * | 2/1986 | Benner et al. ....................... 423/361 |
| 4,755,362 | 7/1988 | Zardi . |
| 5,171,543 * | 12/1992 | Zardi et al. .......................... 423/360 |
| 5,560,891 | 10/1996 | Takashima et al. . |
| 5,585,074 * | 12/1996 | Zardi et al. .......................... 423/360 |

FOREIGN PATENT DOCUMENTS 0545275  6/1993  (EP) .

* cited by examiner

Primary Examiner—Wayne Langel
(74) Attorney, Agent, or Firm—Sughrue, Mion, Zinn, Macpeak & Seas, PLLC

(57) ABSTRACT

A Method for in-situ modernization of a heterogeneous exothermic synthesis reactor, comprising the steps of providing at least a first and at least a second catalytic bed (12, 13) in an upper (2a) respectively lower (2b) portion of the reactor, providing additionally a lowermost catalytic bed (14) in the lower portion (2b) of the reactor having a reaction volume smaller than the reaction volume of the second catalytic bed (13), and loading the lowermost catalytic bed (14) with a catalyst having an activity higher that the activity of the catalyst loaded in the other beds (12, 13). Thanks to the above steps, the present method allows to obtain a reactor with high conversion yield.

2 Claims, 2 Drawing Sheets

METHOD FOR IN-SITU MODERNIZATION OF A HETEROGENEOUS EXOTHERMIC SYNTHESIS REACTOR

DESCRIPTION

1. Application Field

The present invention relates to a method for in-situ modernization of a heterogeneous exothermic synthesis reactor, including an external shell in which a plurality of superimposed catalytic beds in mutually spaced relationship are supported.

More specifically, the invention relates to a modernization method of the type comprising the preliminary step of:

providing at least a first catalytic bed in an upper portion of said shell and at least a second catalytic bed in a lower portion of said shell;

said first and said second bed being loaded with a first catalyst having a predetermined activity.

In the description given below and in the following claims, the term:"in-situ modernization", is understood to mean the on-site modification of a pre-existing reactor in order to improve its performances and obtain e.g. a production capacity and/or a conversion yield comparable to those of a newly-built reactor.

In the terminology of the field, this type of modernization is also termed retrofitting or revamping.

In the description given below and in the following claims, the term:"upper portion respectively lower portion of the shell", is understood to mean the space within the shell that is defined in the upper respectively lower half of the same. More precisely, the upper portion takes up generally about 20–50% of the internal space of the shell, while the lower one takes up about 50–80% of the same.

As is known, in the field of heterogeneous exothermic synthesis in general and, more particularly, in ammonia and methanol production, a double requirement must be satisfied, namely to increase, it is necessary to satisfy a two-fold need, i.e. the one hand increase the production capacity of pre-existing synthesis reactors and, on the other hand, achieve an improvement of conversion yield and a reduction of the reactor energy consumption.

2. Prior Art

For the purpose of satisfying the above-identified need, the so-called technique of modernizing the pre-existing reactors, aiming at avoiding a costly replacement of the latter and achieving at the same time the maximum conversion compatible with the available catalyst volumes, has become increasingly accepted.

For instance, in U.S. Pat. No. 5,585,074 a modernization method is described based on the replacement of the catalytic bed(s) of the pre-existing reactor with new beds of the high-yield radial or axial-radial type, and wherein the intermediate cooling of the gases flowing between the various catalytic beds are effected in the modernized reactor by indirect heat-exchange in two gas-gas heat exchangers located between the first and the second bed, respectively in the third catalytic bed.

Although advantageous in some ways, the modernization methods according to the prior art do not allow to achieve conversion yields comparable to those that are obtainable with the latest synthesis reactors which use a special ruthenium-based catalyst at high reaction activity.

In fact, such methods do not take into consideration the possibility of modernizing the pre-existing reactors by realising a structure than can contain effectively and at low investment costs the aforesaid high activity catalyst.

This is mainly due to the fact that the arrangement and the volumes of the catalytic beds of the modernized reactor are conceived for a conventional catalyst and therefore poorly suitable for use with a high activity catalyst.

In particular, the kinetic and thermodynamic characteristics of conventional catalysts require reaction spaces that are substantially greater than those required if a high activity catalyst is utilised.

Accordingly, the total reaction space of a reactor modernized according to the methods of the prior art, is markedly oversized for a utilisation with a high activity catalyst or, should one wish to exploit as much as possible said reaction space, the amount of high activity catalyst to be loaded in the beds would be such as to require prohibitive investment costs.

With regard to this aspect, it is worth stressing that the ruthenium-based catalyst has had till now—because of its extremely high costs—a very limited application in the practice, even though its particular reaction activity has been known for over ten years and the need of increasing the conversion yield of heterogeneous exothermic synthesis reactors is increasingly felt in the field.

Anyway, the use of such catalyst is nowadays limited to newly built reactors, whose realisation involves therefore very high investment costs, in addition to the cost of the catalyst.

SUMMARY OF THE INVENTION

The problem underlying the present invention is that of providing a method for modernizing a heterogeneous exothermic synthesis reactor, which allows to markedly increase the conversion yield over that obtainable by the modernization methods in accordance with the prior art, with low investment and operating costs and with low energy consumption.

Said problem is solved by a method of the type set forth above, which is characterised by the fact of comprising the steps of:

providing a lowermost catalytic bed in said lower portion of the shell having a reaction volume smaller than the reaction volume of said second catalytic bed;

loading said lowermost catalytic bed with a second catalyst having an activity higher than the one of the first catalyst loaded in the other beds.

In the description given below and in the following claims, the term:"reaction volume", is understood to mean the volume of a catalytic bed taken up by the catalyst, and therefore the space in the bed where the synthesis reaction actually takes place.

Advantageously, the method according to the present invention allows to obtain—while keeping the external structure unchanged—a more effective reactor from the point of view of the conversion yield and thus an increase in the production capacity, by loading a high yield catalyst in a suitably sized lowermost catalytic bed.

In particular, thanks to the present method it is possible to effectively integrate in a pre-existing reactor the utilisation of conventional type catalyst with high activity catalyst, improving in this way radically the performances of the reactor, while keeping the investment costs substantially unchanged with respect to those necessary for the modernization of a reactor according to the methods of the prior art.

Moreover, being in condition of utilising high activity catalyst it allows to operate in the lowermost bed at temperatures lower than the conventional ones, obtaining in this way also savings in the operating costs and in the energy consumption, with respect to the aforementioned methods of the prior art.

Preferably, the lowermost catalytic bed is loaded with a catalyst based on graphite-supported ruthenium, such catalyst having a high reaction activity and at the same time a long working life, as it does not deteriorate and has an excellent resistance at the temperature and pressure operating conditions in the inside of the reactor.

Particularly satisfactory results have been obtained by providing within the shell a lowermost catalytic bed having a reaction volume comprised between 5% and 50% the reaction volume of said second bed, preferably between 10% and 25%.

Additionally, according to a particular and advantageous embodiment of the present modernization method, three catalytic beds are provided in said shell, said first catalytic bed in said upper portion of the shell, said second catalytic bed and said lowermost catalytic bed in said lower portion of the shell, respectively.

In this way, both the kinetic and thermodynamic configuration of the reactor and the utilisation of the available reaction volumes are optimized, so as to drastically increase the conversion yield, while minimizing the investment costs.

In a preferred embodiment of the invention, the present method further comprises the step of:

equipping said lowermost catalytic bed with means for feeding to the same a radial or axial-radial flow of reagent gases.

In so doing, the pressure drops caused by the reaction mixture passing through the catalytic bed are advantageously reduced, thereby reducing energy consumption and operating costs.

Moreover, in case of an axial-radial flow, there is achieved an optimum exploitation of the catalytic mass, preventing catalyst portions from being not swept over by the reaction mixture, remaining therefore non utilised.

As an alternative, and to exploit the above advantages to a greater extent, each of the catalytic beds provided within the shell is preferably equipped with means for feeding to them a radial or axial-radial flow of reagent gases.

In order to prevent dilution effects ensuing from quench-like intermediate cooling, i.e. due to the mixing of the gases flowing between the catalytic beds with cold reagent gases, which affect the conversion yield of the reactor adversely, the modernization method according to the present invention advantageously further comprises the steps of:

providing a first gas-gas heat exchanger in said shell and respective means for the indirect cooling of the gases flowing between said first and said second catalytic bed;

providing a second gas-gas heat exchanger in said shell and respective means for the indirect cooling of the gases flowing between said second and said lowermost catalytic bed.

According to a further aspect of the invention, a method is also provided for effecting high yield heterogeneous exothermic synthesis reactions, of the type comprising the steps of:

feeding gaseous reagents to a synthesis reactor comprising a shell wherein there are supported, superimposed and in mutually spaced relationship, at least a fist catalytic bed extending in an upper portion of said shell, at least a second catalytic bed and a lowermost catalytic bed extending in a lower portion of said shell;

reacting said gaseous reagents in said catalytic beds;

withdrawing from the synthesis reactor the reaction products coming from said lowermost catalytic bed;

which is characterised in that it further comprises the step of:

causing a reaction mixture to flow in said lowermost catalytic bed through a reaction volume smaller than the reaction volume of said second catalytic bed, and comprising a catalyst having a reaction activity higher than the activity of the catalyst loaded in the other catalytic beds.

The characteristics and advantages of the invention are set forth in the description of an example of implementation of a modernization method in accordance with the invention, given hereinbelow by way of non-limiting illustration with reference to the annexed drawings.

DETAILED DESCRIPTION OF A PREFERRED EMBODIMENT

Figure 1:
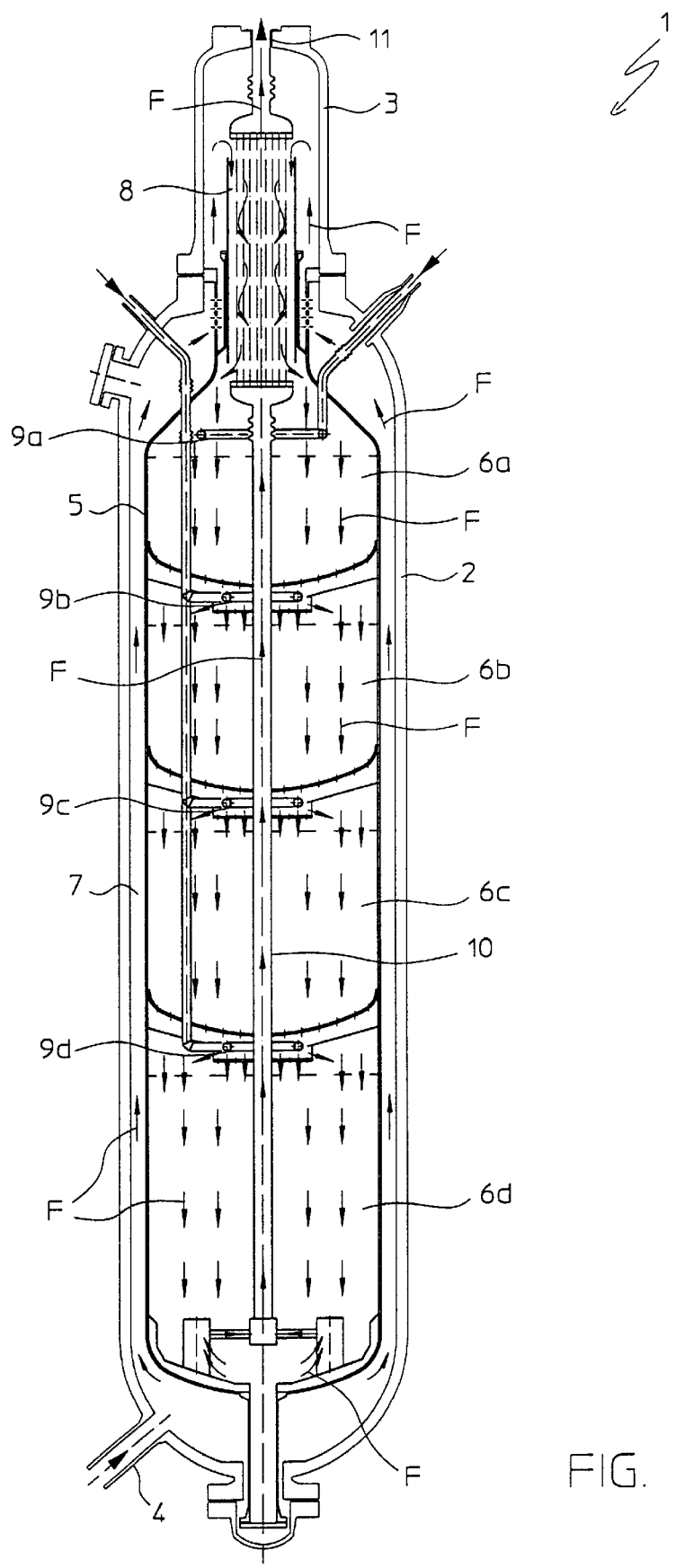
FIG. 1 shows a longitudinal cross-section of a reactor of the so-called Kellogg type for effecting heterogeneous exothermic synthesis reactions.

With reference to FIG. 1, the reference number 1 indicates as a whole a reactor of the so-called Kellogg type for effecting heterogeneous exothermic synthesis reactions at high pressure and temperature (100–300 bar, 300–550° C.), for instance for the production of ammonia.

Reactor 1 comprises a tubular vessel or shell 2, closed on top by a bell-shaped cover 3, and equipped at the bottom with an opening 4 for feeding the reagent gases.

A cartridge 5, comprising four catalytic beds, 6a, 6b 6c and 6d, superimposed and in mutually spaced relationship, is supported in a known manner in the shell 2.

In each catalytic bed 6a–6d there is arranged a conventional catalyst based on iron of average particle size (not shown).

The broken line shown in the catalytic beds 6a–6d defines the upper level reached by the catalyst in the beds and, together with the side walls and the bottom, the reaction volume of said beds.

An essentially annular free-space 7, defined between the cartridge 5 and the shell 2, extends between the opening 4 and a gas-gas heat exchanger 8 designed for preheating the reagent gases which is in turn conventionally supported within the cover 3.

The reactor 1 also comprises a plurality of toroidal distributors 9a–9d, for feeding cold or quenching reagent gases upstream of each of the catalytic beds 6a–6d.

A duct 10, extending coaxially within the catalytic beds 6a–6d, is lastly provided in the reactor 1 for feeding the reaction products leaving the lowermost catalytic bed 6d to the gas-gas exchanger 8, which cools them before their final withdrawal through an opening 11.

In FIG. 1, the arrows F indicate the various paths flown by the gases along the free space 7, through the beds 6a–6d and the heat exchanger 8.

Figure 2:
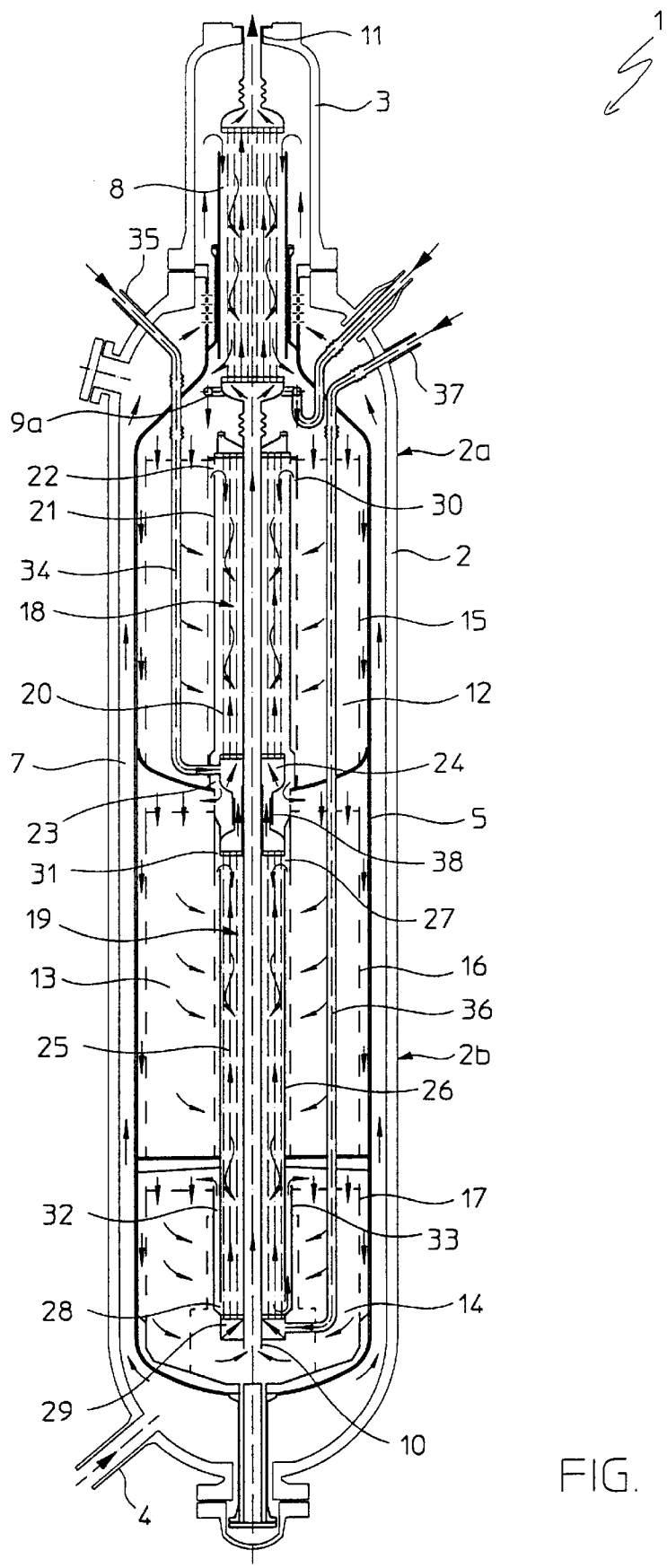
FIG. 2 shows a longitudinal cross-section of a reactor obtained by modifying the Kellogg reactor of FIG. 1 by the modernization method according to the present invention.

FIG. 2 shows as a whole a heterogeneous exothermic synthesis reactor obtained by modifying the reactor of FIG. 1 in accordance with a modernization method of the invention.

In said figure, the details of reactor 1 structurally and functionally equivalent to those illustrated in FIG. 1, are indicated by the same reference numbers and are not further described.

The present invention is not restricted to the modernization of reactors of the so-called Kellogg or bottle-neck type, i.e. having a cover of a smaller diameter with respect to the shell diameter, but may be applied for the modernization of any type of heterogeneous exothermic synthesis reactors with one or more catalytic beds, and thus also for the modernization of reactors of the full opening type, having the closing cover substantially of the same diameter as the shell.

Moreover, the method according to the present invention may also be advantageously applied for the retrofitting of already modernized pre-existing synthesis reactors, for instance for the modernization of a reactor modernized according to the method described in U.S. Pat. No. 5,585,074, mentioned hereinabove with reference to the prior art.

According to a preliminary step of the present method, the cartridge 5 of the reactor 1 is previously emptied of its content and is equipped with at least a first catalytic bed 12 in an upper portion 2a of the shell 2, and at least a second catalytic bed 13 in a lower portion 2b of the same.

In accordance with a further step of the modernization method, a lowermost catalytic bed 14 is advantageously provided in the lower portion 2b of the shell 2, having a reaction volume smaller than the reaction volume of the second catalytic bed 13.

According to the invention, in the first and in the second catalytic bed, 12 respectively 13, a first catalyst (not shown) is also loaded having a predetermined activity, while in the lowermost catalytic bed 14 a second catalyst (not shown) is loaded having a reaction activity higher than the activity of the first catalyst loaded in the other beds.

The catalyst of the first type loaded in the beds 12 and 13 is for instance constituted by a conventional catalyst based on iron with small particle size, while the catalyst of the second type loaded in the lowermost catalytic bed 14 is advantageously a ruthenium-based catalyst, and preferably a catalyst based on graphite-supported ruthenium.

A catalyst of the latter type has a reaction activity which is generally five to twenty times the activity of a conventional iron-based catalyst.

Thanks to the steps of providing a suitably sized lowermost catalytic bed and of loading said bed with a high activity catalyst, an increase in the convention yield of up to 100% can be achieved with respect to the yield obtainable with the reactor of FIG. 1, and of up to 10–40% with respect to the maximum yield obtainable with a reactor modernized according to the method of the prior art as described in U.S. Pat. No. 5,585,074, also realising a saving from the viewpoints of the operating costs and energy consumption.

The investment costs necessary for implementing the modernization method according to the present invention are, on the contrary, surprisingly close to the costs generally required for the modernization according to the prior art and are in any case negligible compared to the resulting benefits in terms of higher conversion yield and higher production capacity of the modernized reactor.

The advantages achieved by the present invention are mainly referable to the utilisation of catalyst having different reaction activity in a pre-existing reactor, and the particular arrangement and sizing of the catalytic bed loaded with the high activity catalyst.

Only after the efforts and researches carried out by the applicant, it was possible to obtain a drastic increase in the conversion yield of a pre-existing reactor, limiting at the same time the investment costs, thanks to the introduction of a small amount of a high activity catalyst in a limited and specific zone of the reactor, and precisely in the reaction zone which is generally considered as more disadvantageous from the kinetic and thermodynamic points of view.

In a particularly advantageous embodiment of the method according to the invention, shown in FIG. 2, an optimum distribution of the reaction volumes and therefore of the catalyst (both of the conventional and of the high activity type) is obtained by providing a single first catalytic bed 12 in the upper portion 2a of shell 2, and the catalytic beds 13 and 14 in the lower portion 2b.

Particularly advantageous results have also been obtained by providing the lowermost catalytic bed 14 with a reaction volume equal to 10–20% the reaction volume of the second catalytic bed 13.

According to a further characteristic of the present invention, each of the aforementioned catalytic beds 12–14 is equipped with known means for achieving a radial or axial-radial gas flow through the same. Said means may for instance comprise annular catalyst baskets 15, 16 and 17, provided with opposed appropriately perforated gas-permeable walls for gas inlet and outlet.

Means of this type for providing an axial-radial gas flow in the catalytic beds are described e.g. in U.S. Pat. No. 4,755,362, the description of which is herein incorporated by reference.

In the example of FIG. 2, the cooling of the gases flowing between a catalytic bed and the adjoining one is advantageously obtained by indirect heat exchange with a cooling fluid, preferably a cold synthesis gas.

To this aim, the present modernization method comprises the additional steps of providing a first gas-gas heat exchanger 18 in the first catalytic bed 12 housed in the upper portion 2a of the shell 2, and a second gas-gas heat exchanger 19 in the second catalytic bed 13 housed in the lower portion 2b of the shell 2.

In FIG. 2, the second heat exchanger 19 advantageously extends also in the lowermost catalytic bed 14, so as to increase the heat exchange surface and to obtain a forced cooling of the reaction mixture to be fed to the last catalytic bed 14, and at the same time a higher heating of the cold gas entering the synthesis reactor 1.

As the lowermost catalytic bed 14 is loaded with a high activity catalyst, it is advantageously possible to conveniently operate at relatively low reaction temperatures, obtaining in this way savings in operating costs and energy consumption.

Preferably, heat exchangers 18 and 19 are arranged within and coaxial to the beds 12, 13 and 14, utilising the openings defined by the annular baskets 15, 16 and 17 in the central part of each of said beds.

According to the invention, in the heat exchangers 18 and 19, respective means are provided for the indirect cooling of the gases flowing between the first and the second catalytic bed 12 and 13, respectively between the second and the lowermost catalytic bed 13 and 14.

Said means comprise a tube nest 20 respectively 25, housed in a tubular shell 21 respectively 26 and equipped with opposed gas inlet and outlet openings 22 and 23 respectively 27 and 28, on the shell side, as well as means for feeding cold gaseous reagents to a gas inlet opening 24 respectively 29, on the tube side of the exchanger 18 respectively 19.

The gas inlet opening 22 respectively 27 on the shell side from the tube nest 20 respectively 25 is in turn in fluid communication with the catalytic bed 12 respectively 13, through an annular free space 30 respectively 31, defined between the external wall of the tubular shell 21 respectively 26 and the gas outlet wall of the basket 15 respectively 16.

On the contrary, the gas outlet opening 23 on the shell side from the tube nest 20 is in direct fluid communication with the catalytic bed 13, while the corresponding gas outlet opening 28 on the shell side from the tube nest 25 is in fluid communication with the catalytic bed 15 through an annular free space 32, defined between the tubular shell 26 and a coaxial wall 33, extending between the shell 26 and the basket 17.

In the illustrated example, the means for conveying the cold gaseous reagents to the tube side opening 24 of the exchanger 18, comprise a duct 34 extending between said opening and an opening 35 for feeding cold gaseous reagents.

In the same way, the means for conveying the cold gaseous reagents to the tube side opening 29 of the exchanger 19, comprise a duct 36 extending between said opening and an opening 37 for feeding cold gaseous reagents.

Lastly, the gas-gas heat exchangers 18 and 19 are sequentially connected to each other on the tube side, for instance through a labyrinth joint 38.

The steps of the modernization method according to the invention may be performed independently on the order followed in the present description and the appended claims, according to the particular technical requirements for implementation that can differ case by case.

Upon conclusion of said steps, a reactor 1 is obtained that allows to perform heterogeneous exothermic synthesis with a high conversion yield and a low energy consumption, in the following way.

The gaseous reagents, fed to the reactor 1 through the opening 4, are pre-heated in the free space 7 and in the exchanger 8 and then fed to the first catalytic bed 12, comprising conventional type catalyst, for instance an iron-based catalyst.

The temperature of the gaseous reagents fed to said first catalytic bed 12 is controlled at the desired values by a first portion of fresh or quench gaseous reagents fed to the reactor 1 by means of the distributor 9a, and by a second portion of gaseous reagents pre-heated in the heat exchangers 18 and 19, as will be explained hereinbelow.

The reaction mixture leaving the catalytic bed 12, which is crossed by a centripetal axial-radial flow, is then collected in the free space 30 and fed to the exchanger 18, in which it is cooled by indirect heat exchange with a cooling fluid flowing in counter-current on the tube side and comprising, in the example of FIG. 2, a mixture of gaseous reagents coming partly from the outside through duct 34 and partly from the underlying heat exchanger 19.

The so cooled reaction mixture is then fed to the subsequent catalytic bed 13, after having flown through the opening 23. The catalytic bed 13 is also loaded with conventional type catalyst, for instance an iron-based catalyst.

From the catalytic bed 13, crossed by a centripetal axia-radial flow, a second reaction mixture comes out, further enriched in reaction products, which is fed—through opening 27—to the exchanger 19, in which it is partly cooled by indirect heat exchange with a cooling fluid flowing in counter-current on the tube side and comprising essentially a mixture of gaseous reagents coming from the outside through duct 36.

Advantageously, the reaction mixture to be fed to the lowermost catalytic bed 14 may be cooled to a temperature substantially lower than the temperature of the reaction mixture entering the catalytic beds 12 and 13.

The so cooled mixture is then fed to the lowermost catalytic bed 14, after having flown through the annular free space 32. Advantageously, the lowermost catalytic bed 14 is loaded with high reaction activity catalyst, preferably based on graphite-supported ruthenium.

From the lowermost catalytic bed 14, crossed by a centrifugal axial-radial flow, emerges a final reaction mixture which is fed through the central duct 10 to the heat-exchanger 8 before its final withdrawal from the reactor 1 by means of the opening 11.

According to the invention, the reaction mixture coming from the catalytic bed 13 is caused to flow in the lowermost catalytic bed 14 through a reaction volume smaller than the reaction volume of said second catalytic bed (preferably between 10% and 40%), and comprising a catalyst that has a reaction activity higher than the activity of the catalyst loaded in the other catalytic beds.

In this way there is obtained a drastic increase in the conversion yield and an ensuing increase in the production capacity of the modernized reactor.

From what has been expounded hereinabove, the many advantages achieved by the present invention become apparent; in particular, it is possible to substantially increase the conversion yield of a pre-existing reactor, reducing at the same time the operating costs and the energy consumption, with very low investment costs.

What is claimed is:

1. Method for effecting high yield heterogeneous exothermic synthesis reactions, comprising the steps of:

feeding gaseous reagents to a synthesis reactor comprising a shell (2) wherein there are supported, superimposed and in mutually spaced relationship, at least a first catalytic bed (12) extending in an upper portion (2a) of said shell (2), at least a second catalytic bed (13) and a lowermost catalytic bed (14) and extending in a lower portion (2b) of said shell (2);

reacting said gaseous reagents in said catalytic beds (12, 13, 14); and withdrawing from the synthesis reactor the reaction products coming from said lowermost catalytic bed (14);

characterised in that it further comprises the step of:

causing a reaction mixture to flow in said lowermost catalytic bed (14) through a reaction volume smaller than the reaction volume of said second catalytic bed (12), and comprising a catalyst having a reaction activity higher than the activity of the catalyst loaded in the other catalytic beds (12, 13).

2. Method according to claim 1, wherein said reaction mixture is caused to flow in said lowermost catalytic bed (14) through a catalyst mass based on graphite-supported ruthenium.

* * * * *